(No Model.)
W. J. & R. L. DAVIS.
COFFEE ROASTER.
No. 602,555. Patented Apr. 19, 1898.
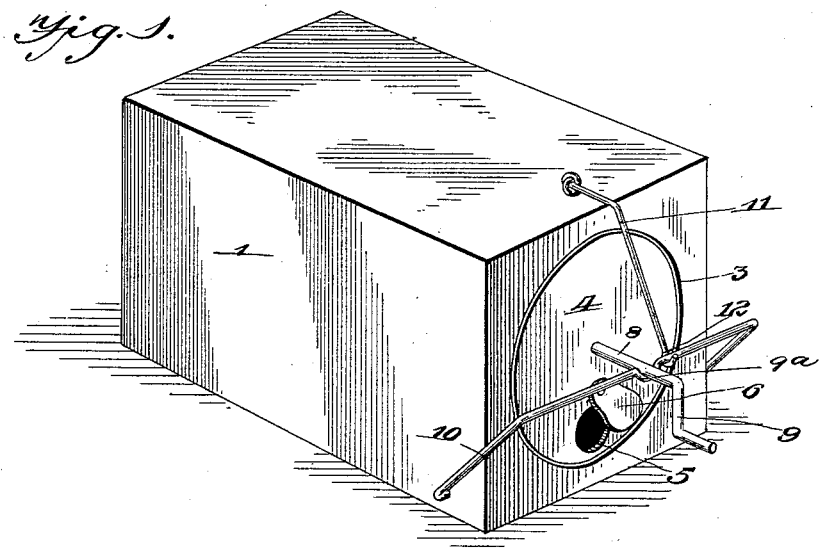
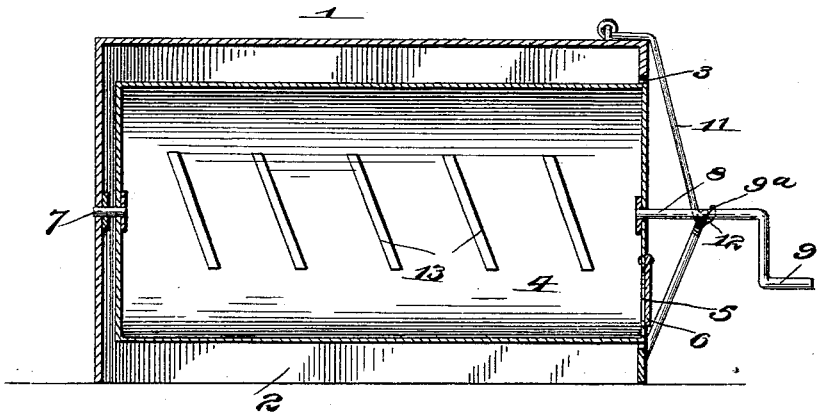
Witnesses
Inventors
William J. Davis
Robert L. Davis
by John Wedderburn
Attorney

UNITED STATES PATENT OFFICE.

WILLIAM JEFF. DAVIS AND ROBERT LEE DAVIS, OF HIDDENITE, NORTH CAROLINA.

COFFEE-ROASTER.

SPECIFICATION forming part of Letters Patent No. 602,555, dated April 19, 1898.

Application filed August 14, 1897. Serial No. 648,292. (No model.)

*To all whom it may concern:*

Be it known that we, WILLIAM JEFFERSON DAVIS and ROBERT LEE DAVIS, citizens of the United States of America, residing at Hiddenite, in the county of Alexander and State of North Carolina, have invented certain new and useful Improvements in Coffee-Roasters; and we do hereby declare the following to be a full, clear, and exact description of the invention, such as will enable others skilled in the art to which it appertains to make and use the same.

This invention relates to coffee-roasters; and it consists of the construction and arrangement of the several parts, which will be more fully hereinafter described and claimed.

The object of the invention is to provide a convenient form of roaster which may be placed upon a stove without interfering with other cooking utensils and by the use of which the aroma of the coffee is preserved and prevented from escaping, the parts being simple and effective in their construction and operation, strong and durable, easily and readily operated, and comparatively inexpensive in the cost of manufacture.

In the accompanying drawings, Figure 1 is a perspective view of a coffee-roaster embodying the invention and showing the parts in dotted lines. Fig. 2 is a central longitudinal vertical section.

Referring to the drawings, wherein similar numerals of reference are employed to indicate corresponding parts in the views, the numeral 1 designates an outer inclosing box or casing, constructed of suitable material and having an open bottom 2, adapted to rest upon a stove or other analogous device. The one end of the said box or casing 1 has a circular opening 3 therein; but aside from the said opening and the open bottom 2 the said box or casing is entirely closed. Removably mounted in the said box or casing 1, and adapted to be inserted thereinto and withdrawn therefrom through the medium of the opening 3 in the one end, is a cylinder 4, also constructed of suitable material and having a lower small opening 5, controlled by a slide or door 6, and by means of which the coffee treated is inserted into and removed from the said cylinder, and at such times as may be found necessary the coffee in the cylinder may be inspected through the said opening. The cylinder is held in a horizontal position and has at its rear end a stub-shaft 7, mounted in a suitable bearing in the rear end of the box or casing 1. At the opposite end a shaft 8 projects outwardly from the casing and is supplied with an operating crank or handle 9. The said shaft 8 has bearing in a block or head 9$^a$, carried at the center of a hinge frame or support 10, and the latter, together with the block or head 9$^a$, is held in proper position relatively to the shaft by a depending angular bent arm 11, formed with a hook 12 on its lower end and engaging the said frame and holding it up, so that the block or head 9$^a$ may properly support the shaft 8. The upper end of the arm 11 is pivotally connected to the top of the casing, as clearly shown.

To remove the cylinder 4 from the box or casing 1, the hooked end 12 of the arm 11 is released from the frame or support 10, and the latter is thereby free to drop by gravity or be moved downwardly and the said cylinder drawn outwardly from the said box or casing through the opening 3. In reversing the cylinder 4 in the box or casing after it is properly positioned the frame or support 10 is brought upwardly, so that the block or head 9$^a$ will bear against the shaft 8, and the hooked end 12 of the arm 11 is placed in contact with said frame.

The box or casing 1 is placed upon a stove or other heating device, as found desirable, and the cylinder 4 rotated through the medium of the shaft 8, thereby continuously changing the position of the coffee contained within said cylinder.

It will be observed that the coffee is closely confined while being roasted, that the aroma is prevented from escaping, and that the said box or casing forms a heating-drum and causes the heat to pass upwardly and around all parts of said cylinder. The opening 5 in said cylinder will be in such position as to make it easy for the insertion of the coffee in or emptying it from said cylinder, and the dimensions of the several parts may be varied at will to suit the application and in accordance with the treatment of large or small quantities of coffee.

On the interior of the cylinder 4 an oppositely-disposed series of diagonally-arranged ribs 13 are arranged and are adapted to turn the coffee-grains over and prevent them clinging or remaining close to the inner surface of the cylinder, and thereby roast more regularly and without harming.

It is obviously apparent that many minor changes in the details of construction and arrangement of the several parts might be made and substituted for those shown and described without in the least departing from the nature or spirit of the invention.

Having thus described the invention, what is claimed as new is—

In a coffee-roaster, the combination of a box or casing having an open bottom and an opening in one end, a cylinder mounted in the said casing and having a shaft projecting from one end, an adjustable frame or support carrying a bearing adapted to be brought in contact with the said shaft, and a movable hooked arm adapted to engage the said frame and hold the bearing against the said shaft, substantially as described.

In testimony whereof we have signed this specification in the presence of two subscribing witnesses.

WM. JEFF. DAVIS.
    ROBERT LEE DAVIS.

Witnesses:
 J. W. MILLER,
 O. F. POOL.